(No Model.)

F. F. LANDIS.
THRASHING MACHINE.

No. 401,840. Patented Apr. 23, 1889.

WITNESSES:
Harry L. Amer
J. J. Masson

INVENTOR·
Frank F. Landis
BY E. E. Masson
ATTORNEY.

UNITED STATES PATENT OFFICE.

FRANK F. LANDIS, OF WAYNESBOROUGH, PENNSYLVANIA.

THRASHING-MACHINE.

SPECIFICATION forming part of Letters Patent No. 401,840, dated April 23, 1889.

Application filed March 3, 1888. Serial No. 266,034. (No model.)

*To all whom it may concern:*

Be it known that I, FRANK F. LANDIS, a citizen of the United States of America, residing at Waynesborough, in the county of Franklin and State of Pennsylvania, have invented certain new and useful Improvements in Thrashing-Machines, of which the following is a specification, reference being had therein to the accompanying drawings.

My invention relates to improvements in thrashing-machines in which a revolving drum armed with teeth is used, in connection with the thrasher-cylinder and reciprocating aprons, to advance the straw and separate the grain therefrom.

Figure 1:
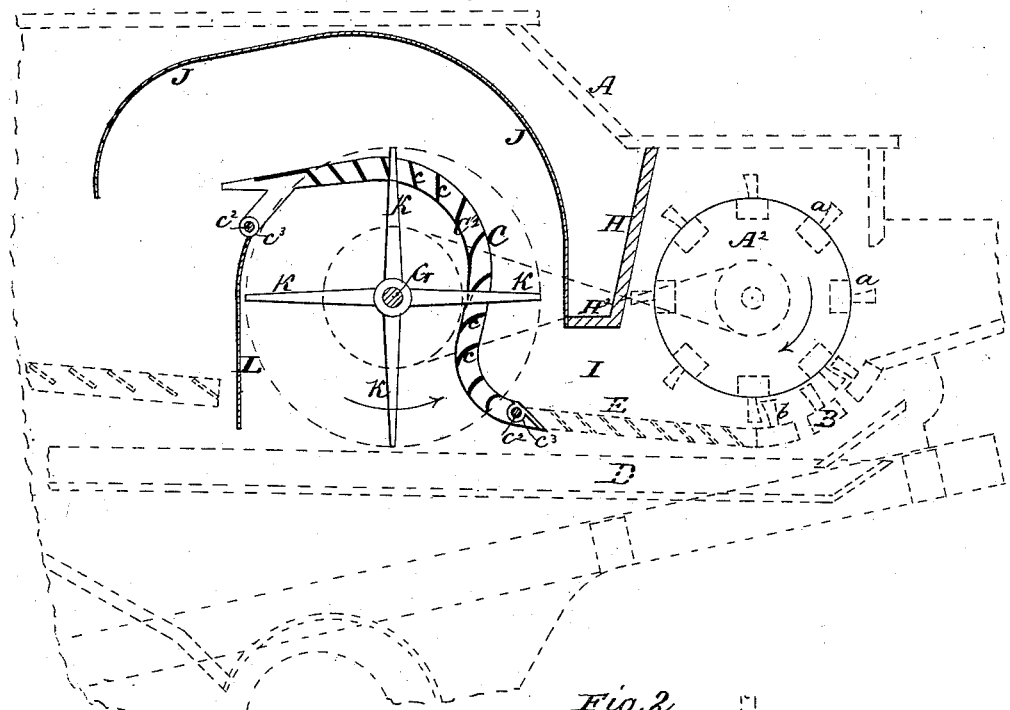
Figure 2:
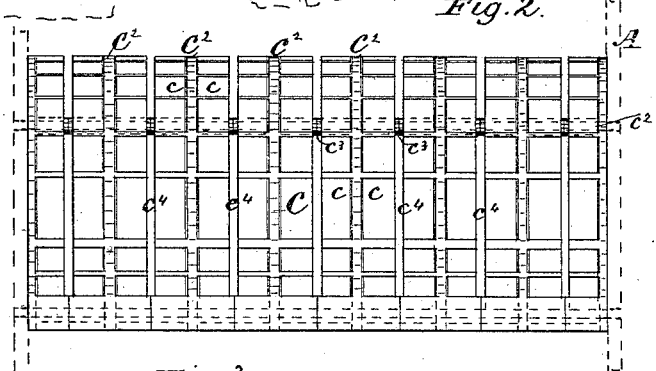
Figure 3:
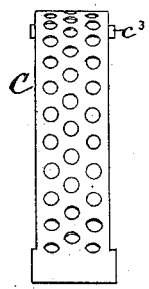

In the accompanying drawings, Figure 1 is a longitudinal vertical section of a portion of a thrashing-machine to illustrate in full lines the parts constructed in accordance with my invention. Fig. 2 is a front view of the standing grate forming a portion of my invention. Fig. 3 represents a front view of a modification of one of the sections of the grate.

In said drawings, A represents in dotted lines the frame of a thrashing-machine having the cylinder $A^2$ provided with teeth $a$, of usual form, under which is placed the concave B, having teeth $b$, also of usual form, and under said concave extends one end of the reciprocating grain bottom board, D, and above said board there is a riddle, E, formed of slats having their upper edges rearwardly inclined to permit the straw to slide easily upon them, but the grain to drop through.

At the rear end of the riddle E the machine is provided with an abruptly-rising curved grate, C, having its middle portion nearly vertical, its front portion curving toward the front or feed end of the machine and its rear portion substantially horizontal. To secure the best separation of the grain, this grate consists of sections having centrally a curved rib, $C^2$, and webs $c$ on each side thereof, set obliquely to the path of the grain, against which the straw can ride up and through which the grain can drop; but the sections may also be made, as shown in Fig. 3, of curved plates provided with perforations, and when so made produce good results. Transversely under the grate C a shaft, G, is supported in bearings and has radial arms or fingers K, which, in their revolutions, pass between the sections of the grate. For this purpose the sections are retained together by bolts $c^2$, passing through the upper and lower ends of their central ribs, and through perforated projections or washers $c^3$, arranged so that the bolts retain the sections at a sufficient distance apart to form slots $c^4$, for the passage of the rotary fingers K. This form of connection can be modified, as the grate can be supported upon bars or bolts secured to the side of the frame.

To prevent the grain projected by the centrifugal motion of the thrashing-cylinder from taking an upper course over the top of the grate C, there is placed directly in the rear of said thrashing-cylinder a pendent partition, H, having its lower end extending preferably down to a point below a horizontal plane passing through the center of said cylinder, and at said lower end there is a short horizontal partition, $H^2$, of any suitable length, according to the distance desired between the thrashing-cylinder and the vertical grate, to form an outlet-passage, I, between said lower end of the partition H and the riddle E; and to direct the straw over the grate C there is placed, at a suitable distance over it, a curved shield or deflector, J, which has its lower end secured to the partitions H or $H^2$ and its upper end suspended from the frame of the machine.

The straw is elevated by the fingers K with sufficient velocity to cause it to follow and lightly rub against the under surface of the curved deflector J along its entire length, and to drop from its rear end upon a straw-carrier in the rear of the plate L. This plate is preferably suspended from the rear end of the grate C, and is thereto arrest the flying grain which passes nearly horizontally through the slots $c^4$ of said grate. By this construction no grain can be projected from the thrasher-cylinder into the straw after it has begun to ascend under the deflector J, and there is but little grain remaining in said straw when it reaches the end of the grate C, as the tendency of the straw-elevating fingers K is to separate and pull the straw from the grain, and the latter drops by gravity through the large openings in the grate, while the straw is floating along the under side of the deflector J in the strong current of air caused by the thrasher-cylinder, and as the fingers move rapidly in succession each one takes only a small quantity of straw, and the latter passes up and over the grate in a thin even sheet, even if the straw is fed irregularly to the cylinder, as any bunches that may be fed in are promptly picked apart by the fingers K. The shaft G, carrying said fingers, has a pulley, around which passes a crossed belt that passes also around a pulley on the shaft of the thrasher-cylinder; but other means may also be used to revolve the shaft G carrying the fingers.

Having now fully described my invention, I claim—

1. The combination of a thrasher-cylinder and its concave with a stationary abruptly-rising curved grate having a series of transverse webs arranged one above the other and retained obliquely to and in the path of the grain projected in the rear of said cylinder, and revolving fingers passing through slots in said grate to elevate straw above it, substantially as described.

2. The combination of a thrasher-cylinder and its concave, an abruptly-rising curved grate in the rear of said cylinder, and revolving fingers passing through slots in said grate, with a correspondingly-curved deflector above said grate and fingers, substantially as and for the purpose described.

3. The combination of a thrasher-cylinder and its concave, an abruptly-rising curved grate having transverse webs, and revolving fingers passing through the slots in said grate, with a pendent partition between said cylinder and grate, and a correspondingly-curved deflector above said grate, substantially as and for the purpose described.

In testimony whereof I affix my signature in presence of two witnesses.

FRANK F. LANDIS.

Witnesses:
D. B. RUSSELL,
ALF. N. RUSSELL.